United States Patent Office 2,970,161
Patented Jan. 31, 1961

2,970,161

6-8-DIHALO OCTANOIC ACID ESTERS AND SALTS THEREOF

John A. Brockman, Jr., Pearl River, N.Y., assignor to American Cyanamid Company, New York, N.Y., a corporation of Maine No Drawing. Filed Nov. 6, 1953, Ser. No. 390,727

7 Claims. (Cl. 260—408)

This invention relates to new organic compounds. More particularly, it relates to dihalo acids of the fatty acid series and methods of preparing the same.

Recent chemical literature describes a vitamin-like substance which occurs widely in nature and is called protogen. The compound, 6,8-dithiooctanoic acid, having the formula:

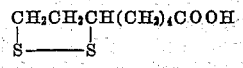

has protogen-like activity and has been found to be a growth supporting factor for certain microorganisms including *S. faecalis, Tetrahymena gelii, Corynebacterium bovis, Butyribacterium rettgeri* and *Streptococcus cremoris*. The splitting of the disulfide linkages in 6,8-dithiooctanoic acid has been described by others as vital to photosynthesis. This compound and closely related compounds having a slightly different side chain are useful as oxidation inhibitors.

It has now been found that certain new dihalo acids are valuable intermediates directly convertible to active compounds such as 6,8-dithiooctanoic acid. These new dihalo acids may be represented by the general formula:

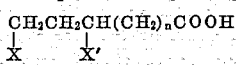

in which X and X' are halogen and $n$ is a whole number from 3 to 5. Since these compounds contain a carboxylic acid group they may also occur in the form of esters, as well as alkali metal and alkaline earth metal salts.

The compounds of the present invention are, in general, liquids at room temperature. They are immiscible with water and soluble or miscible with general organic solvents, such as carbon tetrachloride, acetone, ether, etc.

The compounds of the present invention can be prepared by reacting an omega-cyclopropyl lower fatty acid or ester thereof with halogen or a halogen compound such as iodine monochloride. The omega-cyclopropyl lower fatty acids can be prepared as shown in the examples hereinafter.

The reaction to prepare the compounds of the present invention is usually carried out at room temperature although the temperature may vary from 0° C. to about 75° C. When bromine is used as the brominating agent it is desirable to use irradiation of the reaction mixture as this increases the rate of reaction. It is preferred to have present a solvent such as carbon tetrachloride, acetic acid and the like, when carrying out the reaction. Under certain conditions, such as when using iodine monochloride, it may be desirable to cool the reaction mixture since the reaction is exothermic.

When the reaction is complete the product may be recovered by removing the solvent. It can then be further purified by fractional distillation or the crude product reacted, for example, in alcohol with thiourea and an alkali metal iodide to produce, after hydrolysis and oxidation, for example, 6,8-dithiooctanoic acid shown in the examples hereinafter.

The following examples describe the various methods of preparing dihalo acid of the present invention and the conversion of such acid to the corresponding dithioacids.

*Example 1*

To 108 g. (1.08 mol.) of 5-hexen-1-ol (prepared from allyl magnesium bromide and ethylene oxide) and 24.7 ml. (.307 mol.) of dry pyridine was added 121 g. (.446 mol.) of freshly distilled phosphorus tribromide dropwise, with good stirring, over a period of about one hour, keeping the temperature between −25° and −30° C. by the use of a solid carbon dioxide-acetone cooling bath. The cooling bath was then replaced by an oil bath which was gradually heated to 237° (dense white fumes). Distillate collected from 150°–175°. The distillate was washed with water, 2 N sodium hydroxide, again with water, dried with calcium chloride and distilled. The yield of 5-hexenyl bromide was 106.4 g. (60.5%), boiling 148°–153°.

.899 mol. of sodium ethoxide was prepared by allowing 20.7 g. of sodium dissolve in one liter of absolute ethanol. To this was added 273.5 ml. (1.798 mol.) diethyl malonate and then over a period of 25 minutes 148 g. (.908 mol.) 5-hexenyl bromide. The mixture was refluxed until neutral to phenolphthalein (2 hours), most of the ethanol was removed by distillation, the residue was cooled, mixed with 50 cc. chloroform, and extracted with ice water. The chloroform and residual water were removed from the product at the water pump and the residue distilled at 2.5 to 2.75 mm. Diethyl malonate was recovered at 65°–70° and 171.3 g. (78%) of diethyl 5-hexenylmalonate was collected at 115°–122°.

To a suspension of 40.2 g. (1.06 mols.) lithium aluminum hydrate in 1740 ml. dry ether a solution of 171 g. (0.704 mol.) diethyl 5-hexenylmalonate in 600 ml. of dry ether was added at such a rate (50 min.) as to maintain gentle reflux. After the addition was complete refluxing was continued for about two hours. The mixture was then cooled in ice, 100 cc. of water added cautiously, then 118 ml. of concentrated sulfuric acid diluted with about 500 g. of ice and water. The ether phase was washed with water, dried with sodium sulfate and distilled. The product, 2-hydroxymethyl-7-octen-1-ol, was distilled at 1.5–2.5 mm. to give 96.59 g. (86.7%) at 127°–140°.

The above gylcol dissolved in 400 ml. dry ether was added (40 min.) to a suspension of 58.3 g. (2.42 mols.) sodium hydride in 600 ml. ether. Stirring was continued for an additional 40 minutes, the mixture was cooled in an ice bath and over a period of one hour, 255.5 g. (1.212 mols.) of p-toluene-sulfonyl chloride in one liter of ether was added. Stirring was continued for a total of 74 hours, keeping the temperature always below 18°, and during about half the time at ice temperature. With ice cooling 40 ml. of water was cautiously added, followed by 500 ml. of water more rapidly. The ether phase was separated, washed with water and dried with anhydrous potassium carbonate. The ether was removed at the water pump and the residual oil was crystallized from methanol to give 155.5 g. (55%) of 2-p-toluenesulfonoxymethyl-7-octenyl p-toluenesulfonate, melting point 46°–48.5° C.

The above ditosylate 154 g. (.33 mol.), 148.3 g. (.99 mol.) sodium iodide and 1483 ml. acetone were mixed and refluxed 3.5 hours. Sodium p-toluenesulfonate began to precipitate shortly after the heating was started. The mixture was cooled, three volumes of water were added, the mixture was extracted three times with 300 ml. portions of chloroform, the chloroform extracts were combined and washed with water and after drying with magnesium sulfate and chloroform, removed at the water pump. The residue of 2-iodomethyl-7-octenyl iodide amounted to 122.6 g. (98%) of a light oil. The above diiodo compound was added dropwise over a period of one hour to a gently refluxing, stirred suspension of 84.6 g. (1.3 g. atm.) of zinc dust in 124 ml. of alcohol plus 14 ml. of water. The reflux rate increased noticeably during the addition. The mixture was refluxed for an additional 1.5 hours. Next, 50 ml. of water was added and the mixture was distilled through a short column of glass rings, water being added to the boiler at the same rate the distillate was being collected. A two-phase distillate was obtained first at 76°–78° and later up to 95°. When the distillate was clear and came over about 98°, the distillation was stopped. The combined distillates amounted to about 220 ml. and were diluted with 50 ml. of water, the top phase was separated and the bottom phase was extracted two times with 20 ml. portions of ligroin (35°–55°). The combined top phase and ligroin extracts were washed with water, dried with magnesium sulfate and distilled. The 6-cyclopropylhex-1-ene was collected at 140°–146° at atmospheric pressure and amounted to 34.8 g. (85%).

A stream of ozonized oxygen delivering about 2.23 m. eq. per minute at about .04 cu. feet per minute was passed through a bubbler of ligroin (38°–55°, purified with sulfuric acid and potassium permanganate) and then through a solution of 42.58 g. (.344 mol.) 6-cyclopropylhex-1-ene in 175 ml. ligroin cooled in an ice salt bath. After five hours and twenty minutes a steady break-through of ozone indicated no more was being absorbed. An alkaline suspension of silver oxide was prepared by adding 137.8 g. (3.44 mol.) sodium hydroxide in 688 ml. water to a stirred solution of 351 g. (2.06 mol.) silver nitrate in 688 ml. water. The suspension was heated to about 95° and the ligroin solution of ozonide added dropwise over about two hours, allowing the ligroin to distill out. Stirring and heating were continued for two hours. The cooled mixture was filtered with the aid of diatomaceous earth. The filtrate was acidified with sulfuric acid, extracted with ether; the ether was dried with sodium sulfate and distilled. The colorless product amounting to 35.0 g. (71.5%) was collected at 114°–128° at 9 to 6.5 mm. It was apparently contaminated with some low boiling inpurity since on repeated fractionation an analytical sample boiled at 126°–127° at 7.4 mm. and had $N_D^{20}$ 1.4447, and $d_{20}$ 0.972. This analytical sample of δ-cyclopropylvaleric acid crystallized on cooling and melted at 6° to 7°.

A solution of 7.1 g. (0.050 mol.) cyclopropylvaleric acid in 25 ml. of carbon tetrachloride was treated with a solution of 10.82 g. (0.070 mol.) iodine monochloride in 50 ml. of carbon tetrachloride. The temperature rose spontaneously and external cooling was used to keep the temperature between 30° and 35° as the iodine monochloride was added in portions. After the solution had stood an hour, it was washed with aqueous sodium thiosulfate until colorless and dried with sodium sulfate. The solvent was removed at the water pump to yield 11.45 g. (75% yield) of light oil.

This iodochlorooctanoic acid (.0377 mol.) was refluxed 64 hours in 100 ml. alcohol with 7.15 g. (.0941 mol.) thiourea and 5.65 g. (.0377 mol.) sodium iodide. The resulting mixture was hydrolyzed with alkali, extracted with chloroform, distilled, oxidized and redistilled to give .67 g. crystalline 6,8-dithiooctanoic acid which on recrystallization from cyclohexane melted 60°–62°.

*Example 2*

A 7.00 g. (.0493 mol.) sample of cyclopropylvaleric acid, prepared as in Example 1, was dissolved in 25 ml. of carbon tetrachloride and 7.89 g. (.0493 mol.) of bromine in 40 ml. of carbon tetrachloride was added at about 30° C. Very little action was noted and little or no change was observed even after four hours. The solution was next heated to boiling for one hour, but the evolution of hydrogen bromide indicated that some substitution was taking place instead of the desired addition, so the solution was cooled. It was stored in the cold room overnight and allowed to stand 24 hours at room temperature. By working with small aliquots it was found that irradiation caused decolorization much faster (although still slowly) than t-butylhydroperoxide, ethanol or acetic acid. The solution was irradiated two days in an ice bath and an additional two days at room temperature at which time it was pale yellow in color. The solvent was removed at the water pump to leave 13.6 g. of thick yellow syrup (91% yield). This syrup would not crystallize on chilling to Dry-Ice temperature and came out of ligroin as an oil on cooling. It had a neutralization equivalent of 298

(theory for $C_8H_{14}Br_2O_2$, 304)

and a saponification equivalent of 104 (theory 101).

This crude 6,8-dibromooctanoic acid (.045 mol.) was refluxed with 8.56 g. (.1125 mole) of thiourea in 100 ml. alcohol for 18 hours. Then 7.2 g. (.18 mol.) of sodium hydroxide in 50 ml. of water was added and as the ethanol was slowly distilled, more water was added to the boiler to make up the volume. After the ethanol was removed refluxing was continued for two hours. The solution was then cooled, acidified with sulfuric acid and extracted with chloroform. The chloroform extract was extracted with 1 N sodium hydroxide; this alkaline solution was acidified with sulfuric acid and extracted with chloroform. The chloroform extracts were dried over sodium sulfate, the chloroform removed by distillation and the residue was distilled at 0.09 mm. and the fraction boiling at 135°–151° was retained. This fraction consisted mainly of 6,8-dithioloctanoic acid and was dissolved in 40 ml. of water containing 1.6 g. (.015 mol.) of sodium carbonate. The pH was adjusted to 7.5–8.0 with a few drops of 6 N hydrochloric acid, 0.5 ml. of 1% ferric chloride was added and oxygen was bubbled through the greenish-black solution by means of a sintered glass dispenser for about ten minutes at which time the color suddenly changed to light yellow. The solution was immediately acidified with sulfuric acid and extracted with chloroform. The extract was dried with sodium sulfate and distilled at .07–.09 mm. to give a small forerun at 138°–148° and three cuts between 148° and 158° each of which partially crystallized to a yellow solid. The crystalline fractions were combined on filter paper to absorb away the oil. The yield of crystalline material was 1.28 g. This was crystallized from warm cyclohexane to give 0.80 g., melting at 59°–60° and melting undepressed when mixed with a sample of 6,8-dithiooctanoic acid synthesized by another method.

*Example 3*

To 17.76 g. (.125 mol.) of cyclopropylvaleric acid in 63 ml. carbon tetrachloride was added 30.4 g. (.187 mol.) of iodine monochloride in 190 ml. carbon tetrachloride and worked up as described in Example 1 to yield 27.05 (71%) of iodochlorooctanoic acid, with neutral eq. 308, sapn. eq. 95 (theory 304 and 101). The oil was distilled under a pressure of .065 to .30 and that boiling at 134 to 150 retained. Decomposition gradually set in during the distillation and about 2 g. of boiler residue did not distill. This fraction was mixed with carbon tetrachloride, washed with sodium thiosulfate to remove considerable but not all of the color, dried with sodium sulfate and distilled again to give:

| Cut | ° C. | p. (mm.) | wt. (g.) | $N_D^{20}$ |
|---|---|---|---|---|
| 1 | 114–126 | .035–.05 | 1.21 | 1.4978 |
| 2 | 126–132 | .055 | 1.48 | 1.5020 |
| 3 | 132–136 | .055–.07 | 1.71 | 1.5065 |
| 4 | 136–144 | .07–.09 | 4.36 | 1.5119 |
| 5 | 144–150 | .095–.15 | 2.12 | 1.5225 |

The index of refraction was difficult to read because of the dark color of the distillates and the above values are approximate. Analytical data on cut 3 was consistent with the product being a mixture of about 60% iodochlorooctanoic acid and 40% dichlorooctanoic acid.

When this distilled material was treated with sodium iodide and thiourea as described in Example 1, crystalline 6,8-dithiooctanoic acid was obtained.

I claim:
1. Compounds of the group having the formula:

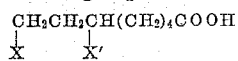

in which X and X' are halogen, esters and salts thereof.

2. Compounds having the formula:

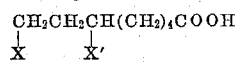

in which X and X' are halogen.

3. 8-chloro-6-iodooctanoic acid.
4. 6-chloro-8-iodooctanoic acid.
5. 6,8-dibromooctanoic acid.
6. 6,8-dichlorooctanoic acid.
7. Compounds of the group consisting of 6,8-dihalooctanoic acids of the general formula HalCH$_2$CH$_2$CHHal(CH$_2$)$_4$CO$_2$H wherein Hal is selected from bromine and chlorine and the lower alkyl esters thereof.

References Cited in the file of this patent
UNITED STATES PATENTS

| | | |
|---|---|---|
| 2,530,348 | Britton et al. | Nov. 14, 1950 |
| 2,557,779 | Britton et al. | June 19, 1951 |
| 2,655,521 | Ladd et al. | Oct. 13, 1953 |

OTHER REFERENCES

"A Suggested Mechanism of the Splitting of the Cyclopropane Ring by Bromine," by H. B. Nicolet and L. Sattler, J. Am. Chem. Soc. 49, pages 2066–2071 (1927).

Frank et al., J. American Chemical Society, vol. 68, pp. 2103–2104 (1946).

Bullock et al., J. American Chemical Society, vol. 74, pages 1868 and 1869 (1952).

Bullock et al., J. American Chemical Society, vol. 74, page 3455 (1952).